United States Patent
Zinn et al.

(10) Patent No.: US 10,010,928 B2
(45) Date of Patent: Jul. 3, 2018

(54) DEVICE FOR CONNECTING STRUCTURAL COMPONENTS, IN PARTICULARLY BY MEANS OF DIRECT SCREWING, ESPECIALLY FLOW HOLE SCREWING, OR BY MEANS OF FRICTION WELDING, AND METHOD FOR CONNECTING STRUCTURAL COMPONENTS, IN PARTICULAR BY MEANS OF DIRECT SCREWING OR FRICTION WELDING

(71) Applicant: DEPRAG SCHULZ GMBH U. CO., Amberg (DE)

(72) Inventors: Gerd Zinn, Hirschau (DE); Rolf Pfeiffer, Amberg (DE)

(73) Assignee: DEPRAG Schulz GmbH u. Co., Amberg (DE)

( * ) Notice: Subject to any disclaimer, the term of this patent is extended or adjusted under 35 U.S.C. 154(b) by 527 days.

(21) Appl. No.: 14/711,287

(22) Filed: May 13, 2015

(65) Prior Publication Data
US 2015/0328676 A1    Nov. 19, 2015

(30) Foreign Application Priority Data

May 13, 2014   (DE) .................. 10 2014 208 994
Nov. 20, 2014  (DE) .................. 10 2014 223 761

(51) Int. Cl.
*B23K 20/12*   (2006.01)
*B21J 5/06*    (2006.01)
(Continued)

(52) U.S. Cl.
CPC ............ *B21J 5/066* (2013.01); *B23K 20/123* (2013.01); *B23K 20/125* (2013.01);
(Continued)

(58) Field of Classification Search
CPC .... B23K 20/12; B23K 20/123; B23K 20/125; B23K 20/129; B23K 20/126;
(Continued)

(56) References Cited

U.S. PATENT DOCUMENTS 4,757,932 A * 7/1988 Benn ............... B23K 20/121
                                              228/102
4,932,280 A * 6/1990 Becker ............... F04D 13/02
                                              464/183
(Continued)

FOREIGN PATENT DOCUMENTS

DE    199 11 308 A1    9/2000
DE    103 48 427 A1    5/2005
(Continued)

*Primary Examiner* — Scott A. Smith
(74) *Attorney, Agent, or Firm* — Laurence A. Greenberg; Werner H. Stemer; Ralph E. Locher (57) ABSTRACT

A device for direct screwing, in particular flow hole screwing, or friction welding includes a guide element extending in an axial direction and being formed in particular as a guide pipe. A driveshaft is movable in the axial direction, disposed within the guide element and driven by a rotary drive. A feed drive is disposed and constructed to generate a feed movement and feed force transmitted to the driveshaft, which is achieved by a feed unit. During the process, depending on a process parameter, a switchover is made from a high feed force to a reduced feed force (flow hole screwing) or to a higher feed force (friction welding). In order to enable the most compact and weight-saving embodiment possible, the feed unit is disposed coaxially to the driveshaft within the guide element and transmits the feed force to the driveshaft in the axial direction and centrally.

19 Claims, 2 Drawing Sheets

(51) Int. Cl.
*B23P 19/06* (2006.01)
*B23K 20/16* (2006.01)
*B29C 65/00* (2006.01)
*B23K 101/18* (2006.01)
*F16B 5/04* (2006.01)

(52) U.S. Cl.
CPC ........ *B23K 20/129* (2013.01); *B23K 20/1255* (2013.01); *B23K 20/1265* (2013.01); *B23K 20/16* (2013.01); *B23P 19/06* (2013.01); *B29C 66/8322* (2013.01); *B29C 66/929* (2013.01); *B23K 2201/18* (2013.01); *B29C 65/00* (2013.01); *F16B 5/04* (2013.01)

(58) Field of Classification Search
CPC ........ B23K 20/1265; B23G 1/18; B23G 7/02; B21J 15/12; B29C 65/00; B29C 65/0672; B29C 66/9221; B29C 66/929; B29C 66/8322
USPC ..... 173/1, 2, 4, 152, 104; 228/2.3, 101, 114, 228/114.5, 177, 102, 112.1, 2.1; 72/71; 227/2, 138
See application file for complete search history.

(56) References Cited

U.S. PATENT DOCUMENTS

| | | | |
|---|---|---|---|
| 6,199,745 B1* | 3/2001 | Campbell | B23K 20/123 228/112.1 |
| 6,296,726 B1* | 10/2001 | Pencak | B29C 65/0672 156/580 |
| 6,406,280 B1* | 6/2002 | Pfeiffer | A61B 17/1628 418/152 |
| 6,499,649 B2* | 12/2002 | Sayama | B23K 20/122 228/112.1 |
| 6,732,900 B2* | 5/2004 | Hansen | B23K 20/123 228/112.1 |
| 7,383,976 B2* | 6/2008 | Sato | B23K 20/125 228/112.1 |
| 7,552,610 B2* | 6/2009 | Fujiuchi | B21J 5/066 470/206 |
| 7,665,650 B2* | 2/2010 | Kashiki | B23K 20/123 228/102 |
| 8,052,030 B2* | 11/2011 | Burton | B23K 20/123 228/112.1 |
| 2005/0189398 A1* | 9/2005 | Sato | B23K 20/125 228/2.1 |
| 2007/0101787 A1 | 5/2007 | Fujiuchi et al. | |
| 2007/0228104 A1 | 10/2007 | Mankus et al. | |
| 2007/0267462 A1 | 11/2007 | Burton et al. | |
| 2008/0093420 A1 | 4/2008 | Mauer | |
| 2013/0094896 A1 | 4/2013 | Christ et al. | |

FOREIGN PATENT DOCUMENTS

| | | |
|---|---|---|
| DE | 10 2004 034 498 A1 | 2/2006 |
| DE | 102010017550 A1 | 12/2011 |
| DE | 102010025387 A1 | 12/2011 |
| DE | 102012009781 A1 | 11/2013 |
| DE | 202012012292 U1 | 4/2014 |
| DE | 202013000092 U1 | 4/2014 |

* cited by examiner

DEVICE FOR CONNECTING STRUCTURAL COMPONENTS, IN PARTICULARLY BY MEANS OF DIRECT SCREWING, ESPECIALLY FLOW HOLE SCREWING, OR BY MEANS OF FRICTION WELDING, AND METHOD FOR CONNECTING STRUCTURAL COMPONENTS, IN PARTICULAR BY MEANS OF DIRECT SCREWING OR FRICTION WELDING

Device for connecting structural components, in particular by means of direct screwing, especially flow hole screwing, or by means of friction welding, and method for connecting structural components, in particular by means of direct screwing or friction welding

BACKGROUND OF THE INVENTION

Field of the Invention

The invention relates to a device and a method for connecting structural components, in particular by means of direct screwing, especially flow hole screwing, or by means of friction welding.

A method for flow hole screwing can be inferred for example from DE 103 48 427 A1. In the case of flow hole screwing two structural components are screwed to one another by means of screwing without preliminary piercing of at least one structural component. Here, in a first process stage, a hole is produced in the structural component in a non-cutting manner and in a second process stage a thread is formed in the produced hole. Both process stages are performed here with a flow hole screw, with which the hole is thus firstly produced in a non-cutting manner and the thread is then formed. The flow hole screw is then also used, lastly, to connect the two structural components to one another via a screwed connection in a third process stage. For the flow hole screwing procedure, the flow hole screw is set here in a rotational movement and is moved in the axial direction with predefined feed force with the aid of a feed drive.

The flow hole screw usually has a conical tip. During the hole-forming procedure in the first process stage, the structural component is first heated by the flow hole screw at the intended hole position on account of a high rotational speed and also a high feed force, and is then plastically deformed. Following the hole-forming procedure, the flow hole screw infiltrates further and uses its screw thread to form the thread in the previously formed hole. For the thread-forming procedure in the second process stage, the rotational speed of the flow hole screw is usually reduced. In the first process stage, in which the structural components are plastically deformed by the heating, rotational speeds in the range from 1000 to 5000 rpm and feed or pressing forces in the range between 0.3 to 1.5 kN are achieved in accordance with DE 103 48 427 A1.

In accordance with DE 103 48 427 A1, the structural components are additionally pressed against one another during the screwing by a holding-down force, which is applied by way of example pneumatically or also by springs. In addition, a feed force acts on the flow hole screw by means of a screw spindle.

A further device for flow hole grooving is described from DE 199 11 308 A1. Here, a single tool is used, which for the hole operation is controlled to a slower feed compared with the subsequent thread forming. A pressing force is generated here by means of a coiled compression spring.

Besides flow hole screwing, a further type of direct screwing is constituted by drill screwing, in which the hole is produced in the first process stage with the aid of a drill screw by drilling, i.e. in a cutting manner, and in the second process stage (similarly to flow hole screwing), a thread is then formed. Direct screwing is understood generally to mean a process in which the hole-forming procedure and the screwing procedure are performed in a common screwing procedure using a screw element also designed to produce the passage in the structural component accompanied by the forming of the thread.

Direct screwing, in particular flow hole screwing, is also used noticeably in the automotive industry. Here, a high cycle rate alongside high process stability is required in particular.

Systems available on the market are characterized by pneumatic systems, by means of which the feed force is generated pneumatically and is transmitted to the screw shaft. In particular with use in the automotive industry, the corresponding devices for flow hole screwing are secured to a hand of a handling robot, in particular a multi-axis industrial robot. As the robot hand moves during a working cycle, high acceleration values occur on the one hand. On the other hand it is often necessary to guide the device in confined installation areas, for example in the case of a motor vehicle body. The systems available on the market are relatively bulky. In order to generate the rotational movement a rotary drive is usually provided, as well as, parallel hereto, a pneumatic feed drive for generating the feed forces, which at times are very high. This feed drive is arranged parallel beside the rotary drive, and the feed forces are transmitted to a driveshaft of the rotary drive via a solid guiding and supporting structure, which is therefore necessary. On the whole, systems of this type therefore require a certain installation volume and on account of the solid supporting structure also have a high weight.

Besides the direct screwing of two structural components, friction welding is also known, for example from DE 10 2004 034 498 A1. In the case of the friction welding described therein, a structural component formed as a connection element is pressed against a stationary structural component and is rotated in the process. As a result of the generated friction, the structural components heat up during a heating phase until the stationary structural component becomes plastic. This is manifested in a torque reduction detectable by a controller. The rotational speed is decreased and reduced to standstill. At the same time, the pressing force can be increased, and the friction weld connection is formed.

BRIEF SUMMARY OF THE INVENTION

On this basis, one object of the invention is to specify a compact device for connecting structural components in particular by means of direct screwing or friction welding, which in particular can be secured to a hand of a handling robot in a compact manner with simultaneous reliable force transmission. A further object of the invention is to enable a method for connecting structural components in particular by means of direct screwing or by means of friction welding using a compact device.

The object is achieved in accordance with the invention by a device having the features recited below. The device comprises a guide element, which extends in an axial direction and which in particular is formed as a guide pipe with typically cylindrical inner cavity. The outer contour of the guide pipe may deviate from a circular shape. A driveshaft is arranged within this guide element and is driven during operation by a rotary drive, which has a rotary motor. Here, the driveshaft can be arranged within the guide element movably in the axial direction. Furthermore, the device comprises a controlled feed drive for generating a feed movement, the feed drive preferably comprising a non-pneumatic feed motor. In order to transmit the feed movement and also a feed force of at least 500 N, in particular of at least 1000 N, the feed drive has a feed unit. Here, a component of the feed unit is movable in the axial direction in order to transmit the feed movement and also the feed force to the driveshaft.

The device also comprises a control unit for controlling the feed drive, the control unit being designed in such a way that during operation the feed force is switched depending on a process parameter. In the case of a flow hole screwing procedure, a switch is made from a high feed force to a reduced feed force. In the case of a friction welding procedure, a switch is usually made to a higher feed force following a softening of the material.

Here, the device is also designed in such a way that the feed unit is arranged coaxially with the driveshaft within the guide unit and acts on the driveshaft in the axial direction for the central transmission of the feed force. The force is therefore transmitted in a manner free from a transverse force, i.e. there are no bending moments, which would have to be intercepted via a solid supporting structure.

This device is therefore conceived especially for direct screwing, in particular flow hole screwing. Similarly, the device is also suitable for friction welding. The device comprises two separate drives, specifically the feed drive and the rotary drive. The coaxial, concentric arrangement of the feed unit relative to the driveshaft is of particular importance so that the high feed forces are thus transmitted centrally and directly to the driveshaft, such that there is thus no need for, or provision of any deflection of the feed force, and a heavy mechanical supporting structure is omitted.

At the front end of the driveshaft a respective connection element is held during operation. This is, in the case of a direct screwing procedure, a screw element, in particular a flow hole screw, and in the case of friction welding a suitable friction weld structural component, as is described by way of example in DE 10 2010 017 550 A1 and which is generally formed in the manner of a pivot pin. A corresponding tool mount or a corresponding holder for a connection element of this type is therefore arranged on an end face of the driveshaft. With this concept of the coaxial arrangement of the feed unit relative to the driveshaft for the central transmission of the feed force, a very compact and also relatively light device is therefore made possible on the whole, which is nevertheless designed for the transmission of high forces and simultaneously high rotational speeds.

With an application for flow hole screwing, the device is designed for transmitting forces of typically up to 5000 N and for high rotational speeds for the driveshaft of typically up to 8000 rpm. With an application for friction welding the device is designed for transmitting forces of typically up to 10,000 N and for high rotational speeds for the driveshaft of typically up to 20,000 rpm. The device is therefore suitable in particular for the intended purpose in the automotive industry, especially for the arrangement of the device with an industrial robot. The device is preferably secured to a robot hand during use.

In accordance with an expedient development the feed unit comprises a spindle drive with two spindle elements, specifically with a spindle nut and with a threaded spindle. The feed force and the feed movement are therefore transmitted effectively and with compact design via the spindle drive. On account of the coaxial arrangement, the embodiment as a spindle drive is particularly suitable, since the coaxial arrangement relative to the driveshaft is thus particularly easy. By way of example, the spindle drive is a threaded spindle drive or ball-and-screw spindle drive. Alternatively to the construction as a spindle drive, a linear drive or also a hydraulic drive is used, for example.

The rotational movements of the feed drive on the one hand, in particular of the spindle drive, and of the driveshaft on the other hand are preferably decoupled from one another. The rotational movement of the feed drive, in particular that of the spindle drive or generally of a feed motor, thus has no influence on the driveshaft and in particular is not transmitted thereto. Merely the axial feed movement and feed force are transmitted to the driveshaft. In view of the rotational movement, these are two completely decoupled drives. As a result of this measure, a simple separate control of the two drives, specifically of the feed drive and of the rotary drive, is made possible. Specifically, in the case of direct screwing a rapid switchover between the two process stages (hole forming and thread forming) is necessary. In the case of friction welding as well, a speedy switchover between two process stages (heating and connection) is necessary. With coupled rotational movement, a rapid, synchronous switchover of the two drives would otherwise be necessary, which can only be implemented with effort.

In the case of the spindle drive it is possible in principle that the spindle nut or the threaded spindle is positioned selectively in a stationary manner and the respective other spindle element is moved in the axial direction in order to transmit the feed movement to the driveshaft.

In an expedient embodiment the threaded spindle is positioned so as to be stationary in the axial direction, and the spindle nut is arranged so as to be adjustable in the axial direction.

In a preferred development the fixed spindle element, i.e. in particular the threaded spindle, and the driveshaft overlap in the axial direction and in particular are arranged coaxially one inside the other. One of these two components is therefore formed as a hollow body and in particular in a sleeve-like manner. This is the driveshaft in particular. A compact design is thus achieved.

One spindle element, i.e. in particular the threaded spindle, and the driveshaft are arranged here one inside the other over an axial guide length, which preferably corresponds at least to a maximum operating stroke. As a result of this arrangement of the two units, which at the same time cooperate with one another in order to transmit the feed forces, a very compact construction of the entire device with short overall length is attained.

The maximum operating stroke and therefore for example also the axial guide length preferably lie in a range from 100 to 150 mm.

A non-pneumatic motor, in particular a first electric motor, is preferably used as feed motor for the feed drive. In addition, there is in principle also the possibility of using a hydraulic motor, for example. A feed drive of this type, in particular an electric motor with spindle drive, has a significantly reduced overall size compared with a pneumatic cylinder. The electric motor is in particular a brushless (DC) electric motor. On the one hand the necessary feed force can be applied in a simple manner with a first electric motor of this type.

On the other hand a first electric motor of this type can be controlled particularly easily and in a defined manner. Compared with a pneumatic motor it is therefore possible in particular to implement a defined rapid switchover at a predefined switchover point between the first and second process stage in a simple manner. In particular in the case of flow hole screwing there is the problem specifically that a switchover must be made as quickly as possible to the low feed force and the slow feed rate between the first process stage, in which the hole is formed, and the subsequent second process stage, in which a thread is formed. Otherwise, there is the problem that the thread of the screw element, in particular of the flow hole screw, moves at high speed and high force against the structural component and will be damaged.

In accordance with a preferred embodiment a switchover is therefore also made between two process stages depending on a parameter correlated to the feed force. In the case of direct screwing the switchover is thus made from a high feed force of the feed drive and a high rotational speed of the rotary drive to a low feed force and a slow rotational speed. In the case of friction welding a switchover is made to a higher feed force and to a lower rotational speed, and in particular the rotational movement is stopped. In principle, the parameter in accordance with which the switchover is made may be the feed force itself, which for example is measured using a load cell. However, the parameter is preferably a drive parameter of the feed drive, which indirectly defines the feed force. With use of an electric motor, the motor current thereof, i.e. the consumed current, is evaluated in particular. The embodiment of the evaluation of a parameter correlated at least to the feed force is based here on the consideration that, following the hole-forming process in the case of flow hole screwing or following the material heating in the case of friction welding, the feed force and therefore the drive parameter correlated therewith decreases characteristically. Here, a characteristic threshold value or also a characteristic decrease of the parameter is evaluated selectively as switchover criterion. The method for controlling the direct screwing process, in particular this switchover, is performed here preferably in accordance with the method as described in DE 10 2014 208 989.1, filed at the same time. Reference is made to the disclosure of this document in its entire scope, and this disclosure is hereby incorporated into the present application. This is true in particular for the method features contained in the claims of said document, which can be applied equally in the device described here. In the case of friction welding the process sequence is implemented for example as described in document DE 10 2004 034 498 A1 specified in the introduction.

For the transmission of the rotational movement of the rotary drive to the driveshaft, the latter is preferably formed in the manner of a splined shaft, in particular with external toothing, which can be driven via an output gear fixed in the axial direction in order to transmit the rotational movement and also a torque. In principle, the driveshaft and the output gear, i.e. generally a drive element for generating the rotational movement, are arranged movably relative to one another in the axial direction in order to transmit the rotational movement to the driveshaft over the entire operating stroke with rotary motor fixed at the same time in the axial direction. Alternatively to the previously described preferred variant, it is also possible to form the driveshaft as a splined hub and to form an output element of the rotary motor as a splined shaft.

Here, the output gear is expediently arranged on a front end of the guide element in the axial direction. Here, the output gear is preferably arranged laterally on the guide element and engages through a corresponding recess within the guide element, which in particular is tubular, with the internally arranged driveshaft. As a result of the arrangement at the front end of the guide element, the particular advantage that the torque is transmitted in the end region is attained, whereby a torsion of the driveshaft is reduced to a minimum. Alternatively, it is also possible in principle to guide the driveshaft through the entire guide element, for example also through a spindle nut, via which the driveshaft is moved in the axial direction, and to drive the driveshaft at the rear end with the aid of the rotary drive.

In an expedient development the rotary drive also has an electric motor, specifically a second electric motor. This is likewise preferably formed as a brushless (DC) electric motor.

This second electric motor is a regulated electric motor, via which the actual screwing procedure is controlled. For this purpose, a torque controller or also another controller is provided, for example, in order to tighten the screw element with a defined torque. Besides a torque controller, other termination criteria for ending the screwing-in procedure, for example an angle of rotation controller, etc., can also be provided.

In view of the most compact embodiment possible, the guide element has an axial length in the range of merely 250 to 350 mm. Here, a possible integration of a motor in a coaxial arrangement within the guide element is not considered. With a coaxial arrangement of this type of a motor, for example of the first electric motor for the feed drive, the guide element is lengthened by the length of this motor, for example by approximately 100 to 150 mm. In principle, it is possible to arrange this feed motor coaxially with the driveshaft or also next to the guide element laterally in relation to the driveshaft. In the latter case, the spindle drive would be connected to the feed motor via a radially arranged output gear—similarly to the manner described previously in the case of the rotary drive.

In view of the most compact embodiment possible in the radial direction, i.e. in order to form, where possible, no interfering contours, even in confined installation spaces, the device has, perpendicularly to a rotational axis, a radial extension to one side of at most 35 mm and preferably of at most 30 mm. This is true in particular with a coaxial arrangement of the feed motor. This is constructed in a very compact manner with the embodiment as electric motor and has a diameter of merely 40 mm, for example. At the same time, further components, in particular the aforementioned rotary drive, can be, and are, arranged laterally on the guide element. This is not critical, since a minimal distance only from one side is often required in the confined installation spaces, whereas a greater installation space is available on the other side. On the whole, a device for direct screwing or for friction welding that defines only a small radial interfering contour and on the whole is constructed in a very compact and also comparatively light manner is therefore created on the whole by the structure described here.

For flow hole screwing, the control unit is formed on the whole in such a way that, depending on the process parameter, in particular the motor current, a switchover is made from a high feed force in the range of greater than 1000 N to a reduced feed force in the range of approximately up to 500 N, and at the same time from a high rotational speed of the driveshaft in the range from 5000 to 8000 rpm to a slow rotational speed in the range from 500 to 2500 rpm.

In the case of a friction welding procedure, the control unit is formed on the whole in such a way that, depending on the process parameter, in particular the motor current, a switchover is made from a high seed force in the range of greater than 2000 N, in particular of greater than 5000 N, to a maximum feed force, which for example is 1000-2000 N greater and in particular is approximately 10,000 N. At the same time, a switchover is made from a high rotational speed of the driveshaft in the range of 5000, preferably of more than 10,000 to 20,000 rpm, to a slow rotational speed up to standstill.

When the defined switchover point is reached, i.e. the characteristic decrease of the motor current, or when a characteristic switchover value of the motor current is undershot, this is detected by an evaluation unit, which for example is integrated in the feed drive and forms part of the control unit. A corresponding control signal is then sent to the rotary drive, which then switches to the slower rotational speed.

The object is also achieved in accordance with the invention by a method for connecting two structural components in particular by means of direct screwing, especially flow hole screwing, or by means of friction welding with the aid of the device described here. The advantages and preferred embodiments specified with regard to the device are to be transferred analogously to the method as well.

BRIEF DESCRIPTION OF THE SEVERAL VIEWS OF THE DRAWING

An exemplary embodiment of the invention will be explained in greater detail hereinafter with reference to the figures, in which.

DESCRIPTION OF THE INVENTION

Figure 1:
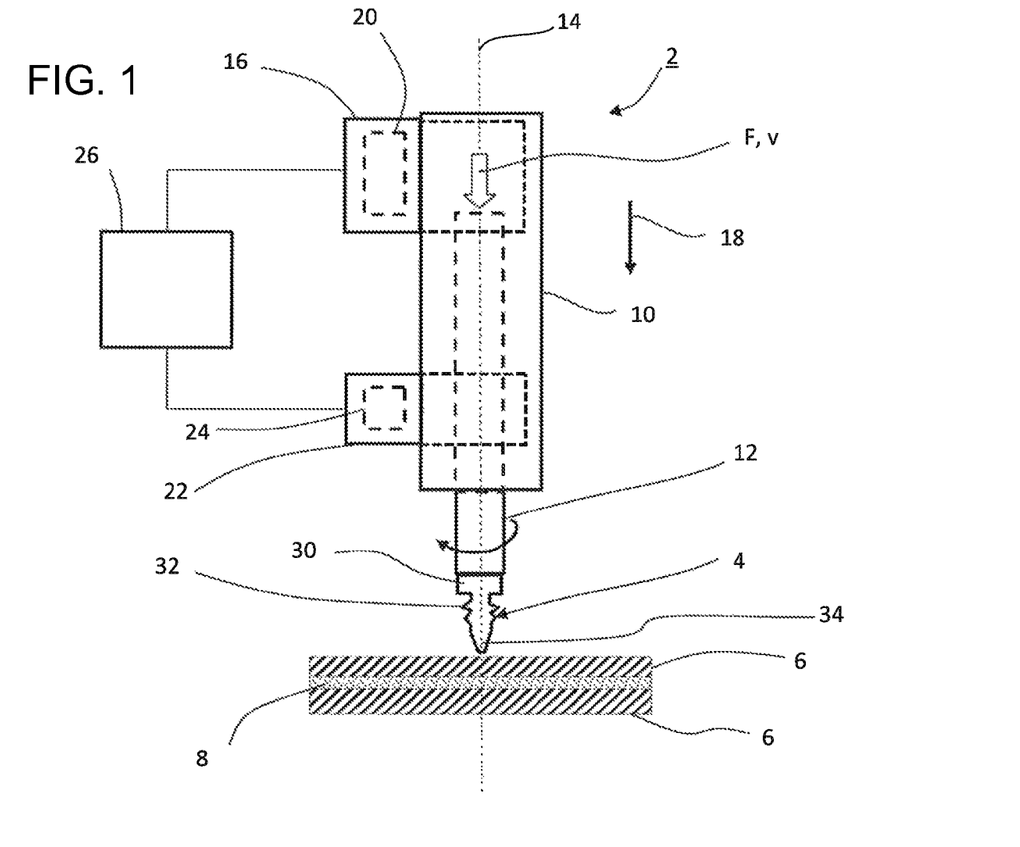
FIG. 1 shows a device for flow hole screwing in a schematic and highly simplified illustration.

The device 2 illustrated in FIG. 1 is used to carry out a flow hole screwing procedure. During this procedure what is known as a flow hole screw 4 is inserted into at least one structural component 6. In the exemplary embodiment two structural components 6 to be connected to one another via the flow hole screw 4 are illustrated and are connected to one another additionally via an adhesive layer 8.

The device is also suitable in principle for a friction welding procedure, in which a connection element is connected as the at least one structural component to a stationary structural component. This friction welding connection element is usually a connection pin with a head region and a shaft region. The connection element is held at the head by the device and during the process is pressed against the further structural component and also simultaneously is rotated at high speed until the material softens on account of the frictional heat. The connection element is then pressed into the softened material and is welded to the structural component. Here, the rotation is reduced to zero.

The device will be explained in greater detail hereinafter on the basis of the exemplary application of flow hole screwing.

The device 2 comprises a guide element 10, which is preferably formed as a guide pipe. A driveshaft 12 formed as a screw driver shaft is mounted rotatably about an axis of rotation 14 within the guide element 10. The device 2 also comprises a feed drive 16 for generating a feed movement in the axial direction 18 and also for generating a feed force F. The feed force F and the feed movement are transmitted here to the driveshaft 12. A feed rate v is transmitted via the feed drive 16 to the driveshaft 12, which is thus moved at this feed rate in the axial direction 18.

The feed drive 16 has a first electric motor 20, with the aid of which the feed force F and the feed rate v are generated, which are transmitted to the driveshaft 12 by means of further components explained in greater detail with reference to FIG. 2. In the schematic illustration of FIG. 1 the first electric motor 20 is secured laterally to the guide element 10.

The device 2 also has a rotary drive 22, which is formed as a screw drive and which moves the driveshaft 12 in rotational movement about the axis of rotation 14. The rotary drive 22 here has a second electric motor 24, of which the output is connected to the driveshaft 12 in order to generate the rotational movement.

The device also comprises a control unit 26 for controlling the direct screwing procedure, in particular the flow hole screwing procedure. Here, the control unit 26 sends control signals to the two drives 16, 22.

In the case of the flow hole screwing procedure a hole (not illustrated here in greater detail) is formed in a first process stage in the structural components 6. For this purpose the driveshaft 12 is driven by means of the rotary drive 22 at high rotational speed. At the same time a high feed force F is exerted by means of the feed drive 16. This lies for example in a range above 1000 N. The high rotational speed lies in a range between 5000 rpm to 8000 rpm, for example. Following completion of the hole-forming procedure the rotational speed is switched over in a second process stage to a slow rotational speed, which merely lies still at 500 to 2500 rpm. At the same time a low feed force is also set, which lies merely still in the range up to 500 N. In particular, a characteristic value of a drive parameter of the feed drive 16 correlated at least with the feed force is evaluated as switchover criterion, in particular the motor current of the first electric motor 20, as described in document DE 10 2014 208 989.1 filed on May 13, 2014.

The flow hole screw 4 is designed especially for this purpose. It has a screw head 30, an adjoining threaded shaft with thread 32 and also a usually conical tip 34 arranged at the end. Here, the tip 34 is designed in such a way that, as the hole is formed, merely a plastic deformation occurs, with no cutting procedure.

Figure 2:
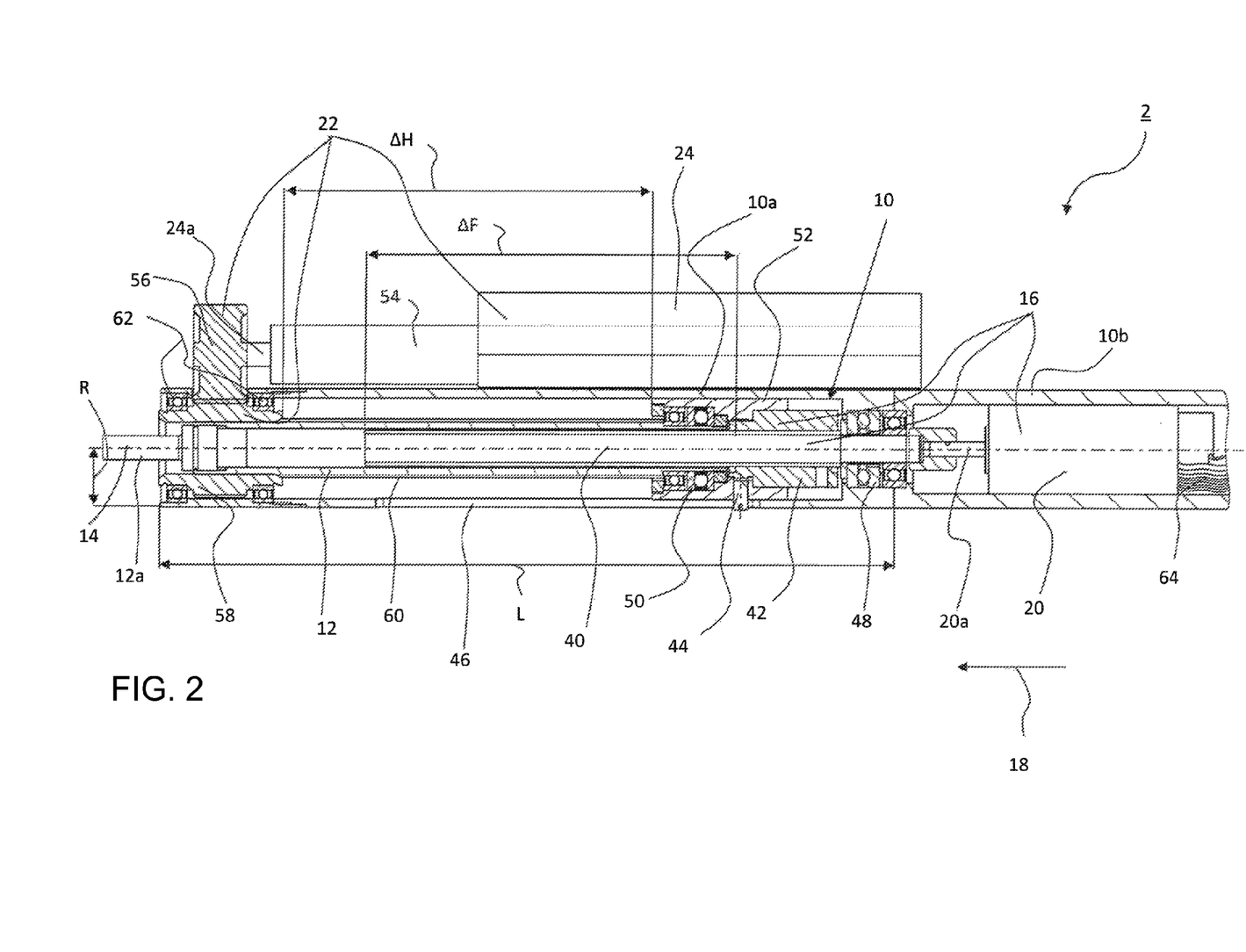
FIG. 2 shows a sectional view of a device for flow hole screwing.

The especially preferred structure of the device 2 will now be presented in greater detail with reference to FIG. 2. The device 2 comprises the guide element 10 formed as cylindrical pipe, which in the exemplary embodiment is formed in two parts and has a front guide portion 10a, on which a rear drive portion 10b is fitted as aligned extension. The first electric motor 20 is integrated within the tubular drive portion 10b. The first electric motor 20 has a first output shaft 20a, via which a threaded spindle 40 is set in a rotational movement. The threaded spindle is guided within a spindle nut 42. The spindle nut 42 is secured against a rotational movement. A cylinder pin 44 is provided for this purpose in the exemplary embodiment and is guided in a longitudinally displaceable manner through a slot 46 extending in the axial direction 18 within the guide element 10 formed as a guide pipe. At a front end of the spindle nut 42, this cooperates with a rear end of the driveshaft 12 in order to transmit the feed force F and the feed rate v to the driveshaft 12. As can be inferred from FIG. 2, the threaded spindle 40 is mounted at its rear, thread-free cylinder end via a first bearing 48. This is preferably formed as a roller bearing. In the exemplary embodiment it is formed as a combination of an axial bearing and a radial bearing.

The driveshaft 12 extends in the axial direction 18 within the guide element 10, in particular within the guide portion 10a, and exits from the guide element 10 via a front shaft portion 12a. In the rear region, the driveshaft 12 is formed as a hollow shaft, into which the threaded spindle 40 plunges. The driveshaft 12 and the threaded spindle 40 are arranged one inside the other and movably relative to one another. At the rear region toward the spindle nut 42, the driveshaft 12 is rotatably mounted in a second bearing 50, again preferably a roller bearing. The bearing 50 is again formed as a combination of an axial bearing and a radial bearing. The spindle nut 42 is decoupled from the driveshaft 12 in the direction of rotation by the axial bearing. The driveshaft 12 is therefore decoupled from the entire spindle drive, formed by the threaded spindle 40 and the spindle nut 42, with regard to the rotational movement of the driveshaft 12.

This second bearing 50 is integrated within a coupling sleeve 52, which is connected to the spindle nut 42 in a rotationally fixed manner and is mounted jointly therewith displaceably in the axial direction 18. The spindle drive is coupled via the coupling sleeve 52 to the driveshaft 12 for transmission of the feed force F and the feed rate. At the same time, the driveshaft 12 is guided within the coupling sleeve 52. The device illustrated in FIG. 2 is illustrated in a fully retracted position, in which the driveshaft 12 is thus located in a fully drawn-in position. With a feed movement, the threaded spindle 40 is set in rotational movement by the first electric motor 20, such that the spindle nut 42 arranged in a rotationally fixed manner is displaced in the axial direction 18. This feed movement is transmitted via the coupling sleeve 52 and the second bearing 50 to the driveshaft 12, such that this moves forward in the axial direction 18 in order to exert the feed movement. The spindle nut 42 and therefore also the driveshaft 12 can be moved by a maximum operating stroke ΔH in the axial direction 18. This preferably lies in the range between 100 and 150 mm. The portion of the driveshaft 12 formed as a hollow shaft extends over an axial guide length ΔF, which preferably corresponds at least to the maximum operating stroke ΔH. It is thus ensured that the driveshaft 12 and the threaded spindle 40 are arranged one inside the other over the entire operating stroke ΔH.

The second electric motor 24 is provided for the drive of the driveshaft 12, i.e. in order to move this in a rotational movement. This second electric motor is arranged laterally beside the guide element 10, more specifically in the guide portion 10a in the exemplary embodiment. This second electric motor 24 is also adjoined by a torque sensor 54, which is arranged in the region of a second output shaft 24a of the second electric motor 24 and which detects the torque exerted by the second electric motor 24. An output gear 56 is arranged at the end of the second output shaft 24a and passes through a recess of the guide elements 10 in the radial direction and is connected to a transmission element, which in the exemplary embodiment is formed as a splined hub 58. Correspondingly to this splined hub 58, the driveshaft 12 is provided on the outer side with a toothing, in particular a splined shaft toothing 60. A rotational movement transmitted from the second electric motor 24 via the output gear 56 is transmitted to the driveshaft 12 via the splined hub 58 and the splined shaft toothing 60. As a result of the splined shaft toothing 60, this is mounted displaceably in the longitudinal direction 18 by the splined hub 58. The splined hub 58 is thus arranged fixedly in the axial direction 18 and is mounted rotatably within the guide element 10 via a third bearing 62. This has two bearing parts distanced axially from one another, in particular roller bearing units. The splined hub 58 is thus set in rotational movement about the axis of rotation 14 via the output gear 56, and with this also the driveshaft 12 via the splined shaft toothing 60. This is transmitted via the end of the driveshaft to the screw element, in particular flow hole screw 4. For this purpose, a holder (not illustrated here in greater detail) is arranged on the end of the driveshaft 12 and is also designed to transmit the rotational movement and the necessary torque to the flow hole screw 4.

By way of example, the torque progression when tightening the flow hole screw 4 is monitored via the torque sensor 54 and the screwing procedure is controlled accordingly.

The control unit 26, which is not illustrated in greater detail in FIG. 2, is also associated with the device 2. This control unit is arranged for example as a separate unit outside the guide element 10 and communicates for example with a superordinate control unit. The device 2 illustrated in FIG. 2 is connected to this control unit 26 via corresponding control and supply lines 64. Alternatively, at least parts of the control unit 26 are integrated in the two motors 20, 24. During operation the control unit 26 controls and monitors the entire process of direct screwing. This can be divided in the case of flow hole screwing into the following sub-steps:
 a) delivery movement
 b) heating
 c) penetration
 d) forming of a passage
 e) thread forming
 f) screwing in and through of the flow hole screw 4
 g) tightening of the flow hole screw 4

During the delivery movement, a feed movement occurs until the flow hole screw 4 contacts the first structural component 6. The control unit increases the rotational movement of the driveshaft already to a high rotational speed of up to 5000 rpm and exerts a high feed force, for example of up to 3500 N, onto the driveshaft 12 via the feed drive 16. The structural component 6 thus heats up and at the same time deforms plastically, such that a hole forms. Following the penetration, the resistance exerted by the structural component 6 decreases suddenly, such that the feed force F decreases comparatively abruptly. This is evaluated by the control unit 26 and is evaluated as a switchover point. In particular, the motor current consumed by the first electric motor 20 is detected and evaluated for this purpose. If this switchover criterion is detected, a switchover is made to a reduced feed force F in the region of, for example, up to 500 N at most, and at the same time a switchover signal is sent to the second electric motor 24 to reduce the rotational speed to a maximum value of, for example, 500 to 2500 rpm. At the same time, the feed rate is limited. For this purpose a rotational speed limitation is provided for the first electric motor 20. As a result of these measures it is reliably ensured that the thread 32 does not contact the structural component 6 at high speed and high feed force. Then, in sub-step e), the thread forming takes place before the actual screwing through and tightening of the flow hole screw 4. This screwing-in procedure of the flow hole screw 4 is controlled in terms of torque via the rotary drive 22, for example.

As a result of the structure of the device 2 described here, this is constructed in a very compact manner on the whole. It has an axial length L of the guide element 10 in the region of the guide portion 10a that lies merely in the range from 250 mm to 350 mm. At the same time, it has a maximum radial extension R on one side that lies merely in the range up to 30 mm and preferably in the range up to 25 mm (in this regard see also FIG. 3 in particular). This radial extension R corresponds here to the radius of the guide element 10. The further components of the rotary drive 22 arranged on one side indeed protrude, however it is crucial that only a small interfering contour is formed on one side by the device 2 with the short radial distance R.

Figure 3:
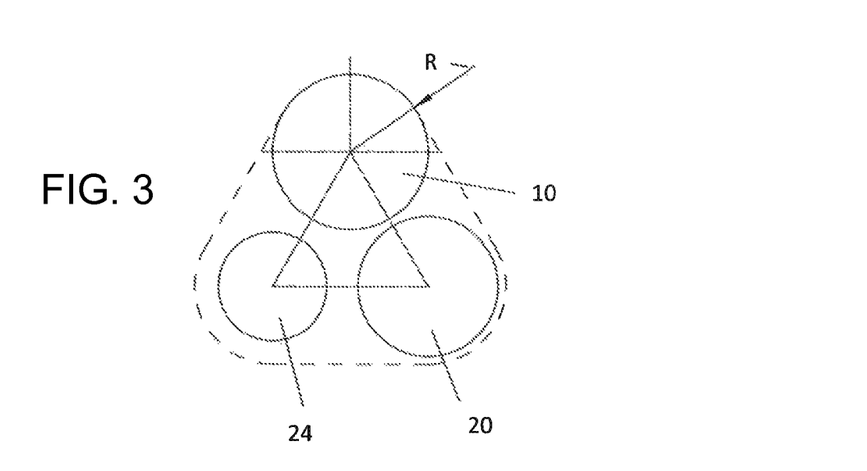
FIG. 3 shows a plan view of a device in accordance with an alternative variant.

Instead of the coaxial arrangement of the first electric motor 20 according to FIG. 2, it is also possible to arrange this radially on the guide portion 10a outside the guide element 10, similarly to the rotary drive 22. Considered in one view, the device 2 then displays an outer contour that can be curtailed approximately by a triangle with the three components constituted by the guide element 10, first electric motor 20 and second electric motor 24 arranged typically in an approximately circular manner. This embodiment is illustrated in FIG. 3. As can be seen, the center axes of the three components 10, 20, 24 lie at the corners of a triangle.

The device 2 described here is preferably arranged during use on a hand of an industrial robot. The individual screw elements, in particular flow hole screws 4, are fed recurrently via an automatic feed unit, for example from a magazine or via a feed tube. The device 2 is used in particular for the direct screwing of two structural components 6 of a motor vehicle body.

| List of reference signs | |
|---|---|
| 2 | device |
| 4 | flow hole screw |
| 6 | structural component |
| 8 | adhesive layer |
| 10 | guide element |
| 10a | guide portion |
| 10b | drive portion |
| 12 | driveshaft |
| 12a | front shaft portion |
| 14 | axis of rotation |
| 16 | feed drive |
| 18 | axial direction |
| 20 | first electric motor |
| 20a | first output shaft |
| 22 | rotary drive |
| 24 | second electric motor |
| 24a | second output shaft |
| 26 | control unit |
| 30 | screw head |
| 32 | thread |
| 34 | tip |
| 40 | threaded spindle |
| 42 | spindle nut |
| 44 | cylinder pin |
| 46 | slot |
| 48 | first bearing |
| 50 | second bearing |
| 52 | coupling sleeve |
| 54 | torque sensor |
| 56 | output gear |
| 58 | splined hub |
| 60 | splined shaft toothing |
| 62 | third bearing |
| 64 | control and supply line |
| F | feed force |
| v | feed rate |
| ΔH | maximum operating stroke |
| ΔF | axial guide length |
| L | axial length |
| R | radial extension |

The invention claimed is:

1. A device for connecting structural components by direct screwing, flow hole screwing or friction welding, the device comprising:
   a guide element extending in an axial direction;
   a rotary drive;
   a driveshaft configured to be driven by said rotary drive and to be moved in said axial direction;
   a feed drive configured to generate a feed movement and a feed force of at least 500 N, said feed drive including a feed unit having a component movable in said axial direction and configured to transmit said feed movement and said feed force to said driveshaft;
   said feed unit being disposed coaxially with said driveshaft within said guide element and acting on said driveshaft in said axial direction for central transmission of said feed force to said driveshaft in a manner free from a transverse force and without bending moments;
   said feed unit having a spindle drive including two spindle elements, said spindle elements including a spindle nut and a threaded spindle, causing said feed movement and said feed force to be transmitted via a rotational movement between said spindle nut and said threaded spindle, said spindle nut and said threaded spindle being disposed coaxially with said driveshaft; and
   a control unit for controlling said feed drive, said control unit switching over during operation from a first feed force to a second feed force depending on a process parameter.

2. The device according to claim 1, wherein said feed drive and said driveshaft perform rotational movements being decoupled from one another.

3. The device according to claim 1, wherein said threaded spindle is positioned in a stationary manner in said axial direction and said spindle nut is disposed adjustably in said axial direction and acts on said driveshaft.

4. The device according to claim 1, wherein one of said spindle elements and said driveshaft are disposed concentrically one inside the other.

5. The device according to claim 1, wherein said driveshaft is formed as a hollow shaft, and said threaded spindle is disposed centrally in said driveshaft.

6. The device according to claim 1, wherein one of said spindle elements and said driveshaft are disposed one inside the other over an axial guide length corresponding at least to a maximum operating stroke.

7. The device according to claim 1, wherein said feed drive has a first electric motor acting as a feed motor.

8. The device according to claim 7, wherein said control unit switches over from said first feed force to a lower feed force or to a higher feed force depending on a parameter correlated at least to said feed force.

9. The device according to claim 8, wherein said parameter correlated at least to said feed force is a motor current of said first electric motor.

10. The device according to claim 1, wherein said driveshaft is formed as a splined shaft, and an output gear for driving said driveshaft is stationary in said axial direction and moves said driveshaft in said axial direction.

11. The device according to claim 10, wherein said output gear is disposed at a front end of said guide element in said axial direction.

12. The device according to claim 1, wherein said rotary drive has a second electric motor.

13. The device according to claim 1, wherein said guide element has an axial length in a range of from 250 mm to 350 mm.

14. The device according to claim 13, which further comprises a drive motor disposed coaxially to said guide element and having a length in addition to said axial length of said guide element.

15. The device according to claim 1, wherein the device extends along an axis of rotation and has a radial extension on one side of at most 30 mm to 35 mm.

16. The device according to claim 1, wherein said control unit is programmed for flow hole screwing and, depending on said process parameter, switches over from a high feed force in a range greater than 1000 N to a reduced feed force in a range up to 500 N and at the same time from a high rotational speed of said driveshaft in a range from 5000 to 8000 rpm to a slow rotational speed in a range from 500 to 2500 rpm.

17. The device according to claim 1, wherein said control unit is programmed for friction welding and, depending on said process parameter, switches over from a low feed force to a higher feed force and from a high rotational speed to a slow rotational speed.

18. The device according to claim 17, wherein said slow rotational speed is 0 rpm.

19. A method for connecting two structural components by direct screwing, flow hole screwing or frictional welding, the method comprising the following steps:

providing a guide element extending in an axial direction;

using a rotary drive to drive a driveshaft and move the driveshaft in the axial direction;

using a feed drive to generate a feed movement and a feed force of at least 500 N, and providing the feed drive with a feed unit having a component movable in the axial direction and transmitting the feed movement and the feed force to the driveshaft;

placing the feed unit coaxially with the driveshaft within the guide element and acting on the driveshaft in the axial direction with the feed unit for centrally transmitting the feed force to the driveshaft in a manner free from a transverse force and without bending moments;

providing the feed unit with a spindle drive including two spindle elements, the spindle elements including a spindle nut and a threaded spindle, causing the feed movement and the feed force to be transmitted via a rotational movement between the spindle nut and the threaded spindle, aligning the spindle nut and the threaded spindle coaxially with the driveshaft; and using a control unit for controlling the feed drive and switching over during operation from a first feed force to a second feed force depending on a process parameter.

* * * * *